Jan. 12, 1960   S. M. MORRISON   2,921,247
ON-OFF AND PROPORTIONAL CONTROL TRANSISTOR SERVOSYSTEM
Filed Nov. 3, 1958   2 Sheets-Sheet 1

INVENTOR.
STUART M. MORRISON
BY
ATTORNEY

Jan. 12, 1960      S. M. MORRISON      2,921,247
ON-OFF AND PROPORTIONAL CONTROL TRANSISTOR SERVOSYSTEM
Filed Nov. 3, 1958      2 Sheets-Sheet 2

INVENTOR.
STUART M. MORRISON
BY Morris Moody
ATTORNEY

United States Patent Office 2,921,247
Patented Jan. 12, 1960

2,921,247

ON-OFF AND PROPORTIONAL CONTROL TRANSISTOR SERVOSYSTEM

Stuart M. Morrison, Cedar Rapids, Iowa, assignor to Collins Radio Company, Cedar Rapids, Iowa, a corporation of Iowa Application November 3, 1958, Serial No. 771,429

5 Claims. (Cl. 318—28)

This invention relates to motor positioning devices and more particularly to a means for controlling a motor in a servo system either directly or proportionally from the error signal thereby permitting either coarse or fine adjustment of the remote servo motor.

Prior systems for controlling the speed and direction of a remotely controlled motor have generally incorporated relays as a means for switching the motor direction. Proportional motor controls for the switching means required that the relays operate at high speeds in order to permit a smooth rotation of the motor shaft. However, the high speed relay systems had poor reliability because of the high wear on the relay contacts. If the operational speed of the relays was reduced to improve their reliability, the motors no longer possessed a smooth rotational characteristic.

Therefore, it is an object of this invention to eliminate the relays that were used in prior proportional circuits.

It is a further object of this invention to improve the reliability of the circuit.

It is still another object of this invention to provide a means for coarse as well as fine control of the motor rotation.

It is a further object of this invention to provide a device that will have a minimum amount of power dissipation, thereby improving the efficiency of the circuit.

The present invention features a transistor amplifier arrangement which is capable of operating in both a coarse and fine manner. When the circuit is operating as a "coarse" control, the motor will be either de-energized or operated with maximum power in a direction responsive to the input error signal polarity. To perform this function, a pair of D.C. amplifiers operate directly from a balanced D.C. source which switches one of the amplifiers "on" and the other amplifier "off" causing the output current from the operating amplifier to operate the motor in accordance with the direction of current through the last stage of the amplifier.

The circuit when operating as a fine control functions as a proportional switching circuit, wherein a large sawtooth voltage is applied to the input of both the A and B amplifiers respectively. A D.C. error signal in cooperation with the sawtooth input signal will generate an output current from each amplifier which is proportional to the error signal. These currents are summed in the motor thereby causing the motor to rotate in the direction of the resultant of the summed currents.

A further feature of this invention is a regenerative feedback loop which is provided in each of the amplifiers. When a signal is received at the input of sufficient magnitude to cause the input transistors to conduct, an output voltage will be fed back to the input of the amplifier. This feedback voltage will cause the input voltage level to surge above the threshold of the input transistors.

Further objects, features, and advantages of the invention will become apparent from the following description and claims when read in view of the accompanying drawings, in which:

Figure 1:
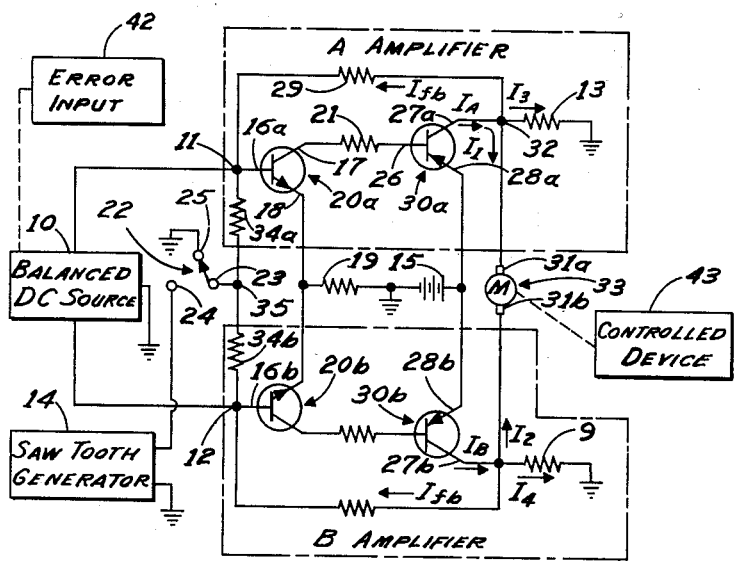
Figure 1 is a schematic of one embodiment of this invention.

With reference to Figure 1, a balanced D.C. source 10 provides a voltage of equal but opposed polarity to each input 11 and 12 of a pair of identical amplifiers A and B. Since both amplifiers are identical, only the A amplifier will be described in detail. The A amplifier contains a pair of transistors 20a and 30a connected as a D.C. amplifier, with base 16a of transistor 20a connected to the input 11. The emitter 18 is connected to ground through a resistor 19, and collector 17 is connected to the base 26 of transistor 30a through a resistor 21. The emitter 28a of transistor 30a is connected to ground through a bias voltage source 15, and collector 27a is connected to a brush 31a of a motor 33. Brush 31b is connected to the collector 27b of transistor 30b. The collector 27a is also connected to ground through a resistor 13. A feedback loop for the A amplifier is provided through a resistor 29 which is connected between the collector 27a of transistor 30a and base 16a of transistor 20a. A pair of resistors 34a and 34b are serially connected between the inputs 11 and 12 of the A and B amplifiers. A junction 35 between resistors 34a and 34b is connected to a switch arm 23 of a switch 22. The output from a sawtooth generator 14 is connected to a switch pole 24. A switch pole 25 is connected to ground.

*Coarse control*

In operation, coarse control of the motor is provided when the amplifiers are operated as straight through D.C. balanced amplifiers with the sawtooth signal removed. This is accomplished by switching the switch arm 23 of switch 22 from pole 24 to pole 25. An input to the balanced D.C. source 10, the operation of which will be explained later, can be a mechanical or electrical error, which will operate on the balanced D.C. source such that a D.C. voltage of opposite polarity and equal magnitude is generated at the inputs 11 and 12 of the A and B amplifiers. All transistors 20a, 20b, 30a and 30b are normally at a state of cutoff. However, a positive voltage will be present on the base 16a of transistor 20a; hence, it will be rendered conductive. When transistor 20a becomes conductive, transistor 30a will likewise become conductive which will in turn cause a current $I_A$ to flow from emitter 28a to collector 27a of transitsor 30a. At a junction 32, $I_A$ will divide into $I_3$ which flows through resistor 13 to ground and $I_1$ which flows through motor 33 and resistor 9 to ground. The current $I_1$ will cause motor 33 to rotate which will in turn position a controlled device 43.

If the error signal should be such that the output voltage from the balanced D.C. source at input 11 should be negative rather than positive, transistor 20a would become non-conductive. Since the voltage at input 12 of the B amplifier is now positive, being of opposite polarity to that of the A amplifier, transistor 20b will conduct. Transistor 30b will likewise conduct, thus creating a current $I_B$ which will flow from emitter 28b to collector 27b of transistor 30b. $I_B$ will likewise split into two components $I_2$ and $I_4$. $I_2$ will flow through motor 33 and resistor 13 to ground, while $I_4$ will flow through resistor 9 to ground. In either case the A amplifier or B amplifier is rendered inoperative, thus causing either transistor 30a or 30b to conduct which will cause the motor 33 to rotate in a direction determined by $I_1$ or $I_2$.

When a voltage appears on the output of either transistor 30a or 30b, a feedback current $I_{fb}$ is developed which, in the case of the A amplifier for example, is fed back in phase with the input 11. This current will develop a voltage across the input resistor 34a that will cause the input voltage to rise suddenly to the saturation level of the transistor.

Figure 2:
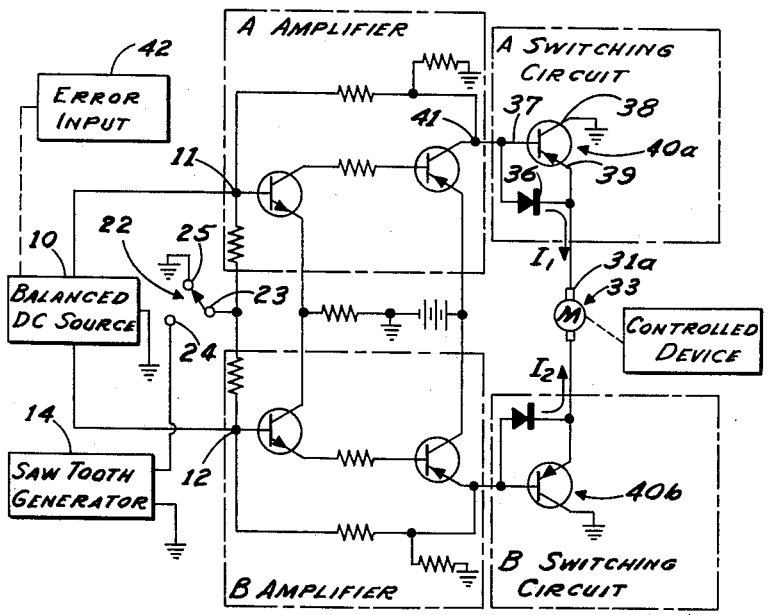
Figure 2 is an improvement over the embodiment shown in Figure 1.

Figure 2 is a modification of Figure 1 in which the switching circuits A and B have been added to improve the efficiency of the circuit. Again the A amplifier will be used to illustrate the operation of the circuit. The output from the transistor 30a is fed into the base 37 of transistor 40a. Collector 38 is connected to ground. The emitter 39 is connected to the brush 31a of motor 33. A diode 36 is connected between the base 37 and emitter 39 of transistor 40a. The input circuit is connected the same as the input circuit of Figure 1, and includes the balanced D.C. source 10, sawtooth generator 14, switch 22 and the A and B amplifiers. The operation of the circuit up to the A and B switching circuits is also exactly the same as that described for Figure 1. However, resistors 13 and 9 of Figure 1 have been increased in resistance such that the majority of current will flow through the switching circuits. When a positive signal appears at the input of the A amplifier from the balanced D.C. source 10, transistors 20a, 30a and 40b will be rendered conductive. A current $I_1$ will flow from the junction 41, through diode 36, the motor 33, and transistor 40b to ground. Transistor 40a, however, will remain non-conductive since the current $I_1$ will cause a slight voltage drop across diode 36 which will cause the emitter 39 to be more negative than the base 37. The current $I_1$ will cause transistor 40b to saturate thereby lowering the emitter-to-ground resistance to a very low value. The lowered resistance will permit a large current $I_1$ to flow through the motor 33 in one direction causing it to rotate accordingly. The reverse procedure will happen if the input 12 should be rendered positive from the balanced D.C. source 10. This condition would cause transistors 20b, 30b and 40a to become conductive, thereby causing a current $I_2$ to flow through the motor 33 in an opposite direction from $I_1$, thereby causing the motor to rotate accordingly.

Fine tuning

Figure 3:
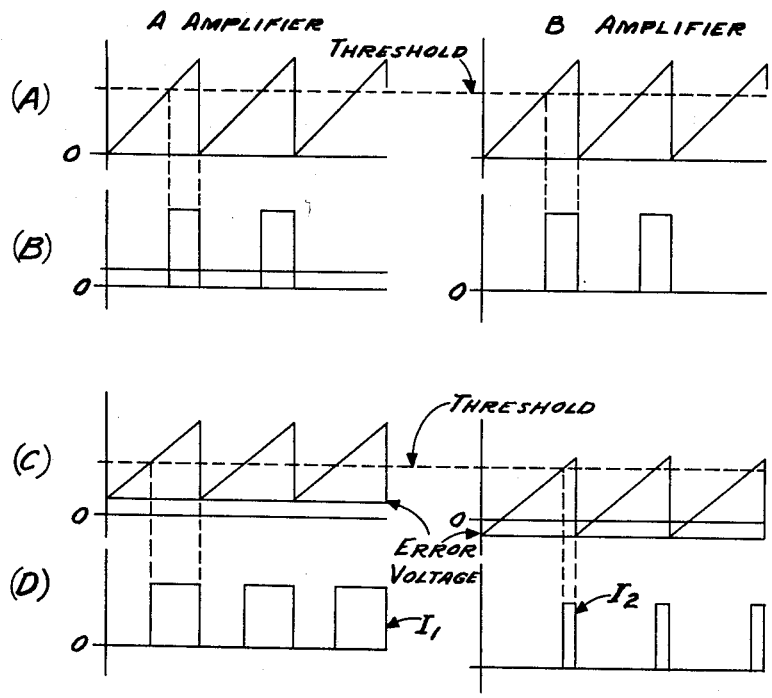
Figure 3 is a representation of the currents in each of the amplifiers.

Fine tuning of both embodiments shown in Figures 1 and 2 can be accomplished by moving switch arm 23 of switch 22 from switch pole 25 to switch pole 24, thereby transferring the junction 35 from ground to the output of the sawtooth generator 14. This will permit a sawtooth voltage of equal phase, magnitude and polarity as shown in Figure 3(a) to be applied at the bases of transistors 20a and 20b. The portion of time that the sawtooth signal exceeds the threshold point of the input transistors 20a and 20b determines the portion of time that each of the transistors will be rendered conductive. Since the sawtooth being applied to each input is of equal magnitude, the average current from each of the amplifiers will be equal. This situation is shown in Figure 3(b). However, since the currents from each of the amplifiers are flowing in opposite directions through motor 33, it will not rotate.

When an error signal from balanced D.C. source 10 is applied to the inputs 11, 12, an unbalanced condition will result. If the error signal applied to input 11 is positive, the error signal applied to input 12 will be of equal magnitude but of negative polarity. If the error signal is positive and the sawtooth signal is positive as illustrated in Figure 3(c), the composite wave at the base 16a of transistor 20a will reach the threshold condition much sooner than the composite signal on the base 16b of transistor 20b. Since transistor 20a is in a state of conduction for a period of time which is much longer than transistor 20b, a higher average current $I_C$ will flow through the switching transistor 40b. Such a condition is illustrated in Figure 3(d). On the other hand, the current $I_3$ resulting from the component signal on transistor 20b will be proportionally less since transistor 20b is cut off for a longer period of time. Since the average value of the D.C. current $I_1$ is much higher than the average value of the D.C. current $I_2$, the motor will rotate in the direction responsive to $I_1$. This circuit, then, permits a proportional control of a D.C. motor without the use of relays. It also permits coarse tuning without any additional circuitry.

It is obvious that the switch 22 could either be controlled manually or by a relay that is responsive to the magnitude of the error signal which would cause the device to switch from coarse to fine when the error signal reached a predetermined amount. It is also obvious that the switch could be removed and the device either permanently connected as a coarse control or a fine or proportional control. Likewise, while a sawtooth generator 14 is depicted as a means of developing a proportional control, any generator that would develop a repeating wave form could be used in its place.

Figure 4:
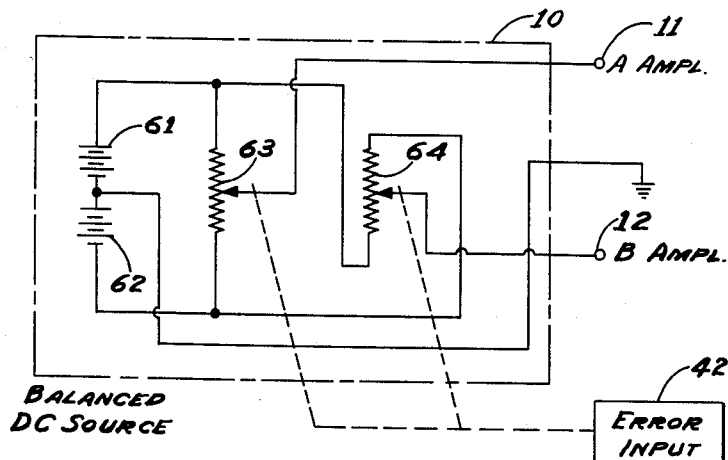
Figure 4 is one form of a balanced D.C. source.

Figure 4 represents a typical balanced D.C. source where a pair of batteries 61 and 62 are serially connected. Adjustable resistor 63 is connected in series with batteries 61 and 62, and adjustable resistor 64 is connected across the batteries such that its output will be opposite to that of resistor 63 for the same direction of mechanical rotation of resistor 63. The output from resistor 64 is connected to input 12 of the B amplifier and the output from the resistor 63 is connected to input 11 of the A amplifier. The midpoint of the serially-connected batteries 61 and 62 is connected to ground. Thus when an error input 42 mechanically moves the adjustable resistors 63 and 64, equal and opposite voltages will appear across the outputs 11 and 12 of the balanced D.C. source. It is also obvious to those skilled in the art that the input to the balanced D.C. source could either be a mechanical shaft which is independently responsive to some external position or responsive to a feedback system such as found in most servo systems.

While particular types of transistors have been shown in a particular embodiment of this invention, it is obvious that other types of transistors or electronic controlling means can be used by the adjustment of circuit conditions and bias voltages.

Although this invention has been described with respect to a particular embodiment thereof, it is not to be so limited as changes and modifications may be made therein which are within the full intended scope of the invention as defined by the appended claims.

I claim:

1. A proportionally-controlled servo system comprising a voltage generating means which includes an error input and first and second outputs wherein the magnitude of the voltages appearing at the outputs are determined by the magnitude of the error introduced at said error input, said output voltages being of equal magnitudes but opposite polarities, a first and second amplifying means, each of said amplifying means including an input and an output, the first output of said voltage generating means connected to the input of said first amplifying means and the second output of said voltage generating means connected to the input of said second amplifying means, a motor means, a first and second means connecting the output of said first and second amplifying means respectively to said motor means, an alternating current generating means, including an output voltage, and means connecting said output voltage to the inputs of said first and second amplifying means, whereby said motor means rotates in a direction responsive to the polarity and at a speed proportional to the magnitude of said output voltage from said voltage generating means.

2. A servo amplifier circuit as claimed in claim 1 wherein said alternating current generating means includes a sawtooth generator.

3. A servo system as claimed in claim 1 whereby said means connecting said alternating current generator to said input of said amplifying means additionally includes a switch, said switch including two positions, the first of said positions connected to said alternating current generator, the second of said positions connected to ground, whereby when said switch is in said first position said alternating current generator is connected to the inputs of said amplifying means thereby permitting proportional control of said servo amplifier circuit and when said switch is in said second position said sawtooth generator is disconnected and said circuit will operate as a course-tuning means for said servo system.

4. A proportionally-controlled servo system as claimed in claim 1 wherein said first and second amplifying means each additionally includes a feedback means, said feedback means applying a proportion of the output voltage of said amplifying means to the input of said amplifying means, whereby the threshold condition of said amplifying means will be substantially eliminated.

5. A servo system as described in claim 1 wherein each of said means connecting said motor means to the outputs of said first and second amplifying means includes a diode and an electronic control device having at least an output element and two control elements, said first control element connected to the output of said first amplifying means, said second control element connected to ground, said output element connected to one pole of said motor means, and said diode connected between the first control element and the output element of said electronic control device.

No references cited.